(12) United States Patent
Maier et al.

(10) Patent No.: US 6,635,723 B1
(45) Date of Patent: Oct. 21, 2003

(54) SOLVENT-FREE POLYURETHANE DISPERSION

(75) Inventors: Alois Maier, Engelsberg (DE); Franz Wolfertstetter, Palling (DE); Herbert Winkelmann, Garching (DE); Josef Weichmann, Pleiskirchen (DE); Alfred Kern, Kirchweidach (DE)

(73) Assignee: SKW Bauchemie GmbH, Trostberg (DE)

( * ) Notice: Subject to any disclaimer, the term of this patent is extended or adjusted under 35 U.S.C. 154(b) by 0 days.

(21) Appl. No.: 09/623,649

(22) PCT Filed: Mar. 23, 1999

(86) PCT No.: PCT/EP99/01985

§ 371 (c)(1),
(2), (4) Date: Oct. 30, 2000

(87) PCT Pub. No.: WO99/50325

PCT Pub. Date: Oct. 7, 1999

(30) Foreign Application Priority Data

Mar. 24, 1998 (DE) .......................................... 198 12 751

(51) Int. Cl.⁷ ............................. C08J 3/00; C08K 3/20; C08L 75/00; C08F 20/00
(52) U.S. Cl. ...................... 525/459; 524/591; 524/839; 524/840
(58) Field of Search ................................ 524/591, 839, 524/840; 525/459

(56) References Cited

U.S. PATENT DOCUMENTS 5,656,701 A   8/1997   Miyamoto et al.

FOREIGN PATENT DOCUMENTS

| CA | 2033530 | 7/1991 |
| CA | 2132905 | 4/1995 |
| DE | 1 495 847 | 5/1969 |
| DE | 38 39 940 | 5/1990 |
| DE | 38 39 940 A1 | 5/1990 |
| DE | 40 00 748 | 7/1991 |
| DE | 43 34 563 A1 | 4/1995 |
| DE | 43 34 563 | 4/1995 |
| EP | 04 98 218 | 8/1992 |
| EP | 0 666 275 A2 | 8/1995 |
| EP | 06 66 275 | 8/1995 |
| EP | 07 00 945 | 3/1996 |
| EP | 0 849 298 A1 | 6/1998 |
| WO | 91 11 477 | 8/1991 |
| WO | 97 10 274 | 3/1997 |

*Primary Examiner*—Patrick D. Niland
(74) *Attorney, Agent, or Firm*—Fulbright & Jaworski L.L.P.

(57) ABSTRACT

A description is given of a solvent-free polyurethane dispersion having a high solids content of polyurethane polymer or fillers, which is obtainable by a) allowing a relatively high molecular weight polyol component (A) (i) and, if desired, a low molecular weight polyol component (A) (ii) to react with a polyisocyanate component (B) in the presence or absence of a catalyst to give a polyurethane preadduct, then b) reacting the polyurethane preadduct from step a) with a low molecular weight and anionically modifiable polyol component (A) (iii) containing two or more hydroxyl groups and one or more carboxyl groups to give the corresponding prepolymer, c) allowing the prepolymer from step b) to react with a neutralization component (C) until the carboxyl groups have been completely or partially neutralized, subsequently or simultaneously d) dispersing the neutralized prepolymer from step c) in water which may further comprise a formulation component (F) comprising fillers, pigments, plasticizers, fibrous materials and other customary additives, subsequently e) reacting the dispersion from step d) with a chain extension component (D), and f) if desired, allowing the dispersion from step e) to react with a chain stopper component (E).

The polyurethane dispersion of the invention has an ideal linear segmented structure due to its method of preparation and has extraordinarily high solids contents combined with comparatively low viscosities, complete freedom from solvents, excellent materials properties (e.g. elasticity, elongation and tensile strength) and is prepared by a technically simple process.

34 Claims, No Drawings

SOLVENT-FREE POLYURETHANE DISPERSION

The present invention relates to a solvent-free polyurethane dispersion having a high solids content of polyurethane polymer or fillers, a process for preparing such polyurethane dispersions and their use in the building sector for single-component, isocyanate-free and solvent-free coatings, sealants, adhesives or membranes.

For reasons of environmental protection and with a view to adherence to existing emission guidelines, considerable efforts have been made in recent years to develop water-based polyurethane dispersions having a very low content of volatile organic compounds (VOC). These low-solvent (low VOC) or solvent-free (zero VOC) products offer both ecological and economic advantages and already largely correspond in terms of their performance to solvent-containing products. The excellent material properties of the polyurethane dispersions make many applications possible for these binders.

Polyurethane dispersions are also gaining ever greater importance in building applications such as paints and varnishes, coatings, sealants and adhesives. In building applications, solvent-free polyurethane dispersions having a high solids content of polyurethane polymer or fillers, which can be made available by means of efficient and at the same time universal production processes, are particularly sought.

The preparation of aqueous polyurethane dispersions has been known for many years and is described in detail in a great number of publications, e.g. Houben-Weyl, Methoden der organischen Chemie, volume E 20, part I, pp. 1659–1681; D. Dieterich, Prog. Org. Coat. 1981, 9, 281–330; J. W. Rosthauser, K. Nachtkamp, Journal of Coated Fabrics 1986, 16, 39–79; R. Arnoldus, Surf. Coat. 1990, 3 (Waterborne Coat.), 179–98.

Aqueous polyurethane dispersions comprise polyurethane polymers or polyurethane-polyurea polymers which contain both urethane groups and urea groups and are obtainable by polyaddition reactions of polyols, polyisocyanates and polyamines. The polyols and the polyisocyanates are firstly reacted to produce polyurethane prepolymers which are then dispersed in the aqueous phase and chain-extended using polyamines to form the polyurethane-polyurea polymers. Moreover, the polyurethane polymers contain a sufficient number of hydrophilic groups which ensures stabilization in the aqueous phase. These hydrophilic groups can be anionic, cationic and/or nonionic groups. The charge density of the hydrophilic groups on the polyurethane polymer depends on the characteristics and the stoichiometry of the formative components used. Polyurethane dispersions are two-phase systems made up of micelles comprising polyurethane polymers and an aqueous phase. When the polyurethane dispersions are dried, the micelles coalesce or melt together to form a film of the polyurethane polymers.

For the preparation of polyurethane dispersions in the industry, the prepolymer mixing process and the solvent process have achieved the greatest importance.

However, these conventional processes for preparing polyurethane dispersions suffer from various problems.

In the prepolymer mixing process, significant amounts of high-boiling and water-soluble solvents, e.g. N-methylpyrrolidone, are added to reduce the viscosity of the polyurethane prepolymers. These solvents remain in the polyurethane dispersion after the production process. When the polyurethane dispersions or the products produced therefrom are dried, these solvents are given off into the environment. It is not only the solvent content but also the low solids contents, the usually moderate material properties and the large amounts of hydrophilic groups necessary to stabilize the polyurethane dispersions which are disadvantageous. However, the prepolymer mixing process represents a simple and effective production process with a large synthetic bandwidth, which is of great advantage in many cases.

In the solvent process or acetone process, the complete formation of the polyurethane polymers is carried out in the presence of large amounts of low-boiling and water-soluble solvents, for example acetone or methyl ethyl ketone. After the preparation of the polyurethane dispersion, the solvents have to be removed again by costly redistillation, so that the resulting polyurethane dispersions are largely solvent-free. The freedom from solvents and also the high solids contents, the excellent material properties and the small amounts of hydrophilic groups required for stabilizing the polyurethane dispersions are advantageous. However, the solvent process is a complicated and not economically optimal production process giving a low space-time yield, which is a great disadvantage especially with a view to building applications.

In addition, there are also various combinations of prepolymer mixing process and solvent process, but these have similar problems. Thus, a mixture of low- and high-boiling solvents can be used in the prepolymer mixing process, or the complete formation of the polyurethane dispersion can be shifted into the aqueous phase in the solvent process. However, the abovementioned problems cannot be eliminated even by these methods.

More recently, there have been increasing efforts on the part of manufacturers of polyurethane dispersions to replace solvents such as N-methylpyrrolidone by ecologically acceptable glycol ethers which are not subject to labeling laws, for example dipropylene glycol dimethyl ether (Proglyde DMM® from Dow). However, such a change leads to an increase in costs in the prepolymer mixing process.

The patent applications EP-A-0 712 877 and EP-A-0 808 859 describe solvent-free polyurethane dispersions having high solids contents which are produced by a modified solvent process. These polyurethane dispersions are used for producing sealing compounds and sprayable sealers. However, the process used for preparing the polyurethane dispersions is restricted to polypropylene glycols and cannot be applied to further polymeric polyols. In the preparation of these polyurethane dispersions, simultaneous dispersion and chain extension is carried out in the aqueous phase, and the solvent present is subsequently removed again by distillation. The examples described involve only polyurethane dispersions which are chain-extended by means of water. However, it is known from the chemistry and technology of polyurethane dispersions that such a procedure suffers from serious problems. In the case of polyurethane dispersions based on polypropylene glycols, the redistillation of solvents such as acetone or methyl ethyl ketone is made considerably more difficult by polar interactions. Chain extension using water is known to lead to products having a poor shelf life and reproducibility. The strong gas evolution from the isocyanate/water reaction during a chain extension makes the redistillation of the solvents even more difficult.

EP-A-0 741 152 discloses polyurethane dispersions based on various polypropylene glycols having a comparatively low degree of unsaturation or a low content of monools. These polyurethane dispersions are prepared by the prepolymer mixing process, comprise N-methylpyrrolidone as solvent and have only low solids contents.

DE-A 40 11 455 discloses solvent-free polyurethane dispersions based on polyalkylene glycol mixtures. These polyurethane dispersions are prepared using relatively low NCO/OH equivalent ratios and accordingly have low solids contents and high viscosities.

Polyurethane dispersions having a low VOC content are also described in EP-A-0 553 714. These polyurethane dispersions are based on various polymeric polyols and 1,3-bis(1-isocyanato-1-methylethyl)benzene (m-TMXDI) and may further comprise N-methylpyrrolidone. They are prepared by the prepolymer mixing process using low NCO/OH equivalent ratios. The solids content of these systems is relatively low.

Finally, U.S. Pat. No. 5,656,701 discloses low-solvent or solvent-free anionic and cationic polyurethane dispersions based on various polymeric polyols, which are prepared by means of the prepolymer mixing process or the solvent process using low NCO/OH equivalent ratios. Chain extension or chain stopping is carried out using exclusively hydrazine derivatives. The claimed solids content of these systems is a maximum of 50% by weight, but the examples reported give only products having a maximum solids contents of polyurethane polymer of 40% by weight.

It is therefore an object of the present invention to develop a solvent-free polyurethane dispersion having a high solids content of polyurethane polymer or fillers, which does not have the stated disadvantages of the prior art but instead has good use properties and can at the same time be prepared in an inexpensive and environmentally friendly way.

This object is achieved according to the invention by provision of a solvent-free polyurethane dispersion, which is obtainable by a) allowing from 10 to 50% by weight of a relatively high molecular weight polyol component (A) (i) which has at least two hydroxyl groups which are reactive toward polyisocyanates and a molar mass of from 500 to 6000 dalton plus, if desired, from 0.5 to 5% by weight of a low molecular weight polyol component (A) (ii) having at least two hydroxyl groups which are reactive toward polyisocyanates and a molar mass of from 60 to 150 dalton to react with from 5 to 25% by weight of a polyisocyanate component (B) comprising at least one polyisocyanate, polyisocyanate derivative or polyisocyanate homologue containing at least two aliphatic and/or aromatic isocyanate groups in the presence or absence of a catalyst to give a polyurethane preadduct, then b) reacting the polyurethane preadduct from step a) with from 0.5 to 5% by weight of a low molecular weight and anionically modifiable polyol component (A) (iii) containing at least two hydroxyl groups which are reactive toward polyisocyanates and at least one carboxyl group which is inert toward polyisocyanates and can in the presence of bases be converted completely or partially into carboxylate groups to give the corresponding prepolymer, c) allowing the prepolymer from step b) to react with from 0.25 to 2.5% of a neutralization component (C) until the carboxyl groups have been completely or partially neutralized, subsequently or simultaneously d) dispersing the neutralized prepolymer from step c) in from 10 to 60% by weight of water which may contain from 10 to 70% by weight of a formulation component (F) selected from among fillers, pigments, plasticizers, fibrous materials and/or other customary additives, subsequently e) reacting the dispersion from step d) with from 0.25 to 2.5% by weight of a chain extension component (D) comprising at least one polyamine having at least two amino groups which are reactive toward polyisocyanates, and f) if desired, allowing the dispersion from step e) to react with from 0.05 to 0.5% by weight of a chain stopper component (E) selected from at least one monoamine having an amino group which is reactive toward polyisocyanates.

It has surprisingly been found that the polyurethane dispersion of the invention preferably has an ideal linear segmented structure due to its method of preparation. The expression "ideal linear segmented structure" means that the polyurethane polymer possesses a linear structure and has all formative components in a regular sequence, which results in the particular properties of the polyurethane dispersion of the invention.

The polyurethane dispersion of the invention is defined by the multistage process for preparing it. To carry out this process, from 10 to 50% by weight of a polyol component (A) (i) and, if desired, from 0.5 to 5% by weight of a polyol component (A) (ii) are reacted in reaction step a) with from 5 to 25% by weight of a polyisocyanate component (B) in the presence or absence of a catalyst using the techniques customary in polyurethane chemistry to give a polyurethane preadduct. Here, the percentages are in each case based on the pure polyurethane dispersions or polyurethane dispersions formulated in situ.

The component (A) (i) comprises at least one relatively high molecular weight polyol having two or more hydroxyl groups which are reactive toward polyisocyanates and a mean molar mass (number average $M_n$) of from 500 to 6000 dalton, in particular on the basis of a polyether polyol and/or polyester polyol. The polyols here are preferably polymeric polyols such as polyalkylene glycols, aliphatic and/or aromatic polyesters, polycaprolactones, polycarbonates, macromonomers, telechelic polymers or epoxy resins or mixtures thereof. Polyalkylene glycols are obtainable, for example, from monomers such as ethylene oxide, propylene oxide, butylene oxide or tetrahydrofuran by polymerization in the presence of boron trifluoride or by polyaddition onto starter compounds having reactive hydrogen atoms, e.g. water, alcohols, amines or bisphenol A. It is also possible to use mixtures of the monomers simultaneously or in succession. Suitable polyalkylene glycols are, for example, polyethylene glycols, polypropylene glycols (e.g. Voranol grades from Dow), mixed polyglycols based on ethylene oxide and propylene oxide, and also polytetramethylene glycols or polytetrahydrofurans (e.g. polyTHF 2000 from BASF). Preference is given to linear or bifunctional polypropylene glycols having a mean molar mass (number average $M_n$) of from 3000 to 4000 dalton. Aliphatic and/or aromatic polyester polyols are obtainable, for example, by polycondensation reactions and/or polyaddition reactions from dihydric or polyhydric alcohols and dibasic or polybasic carboxylic acids, carboxylic anhydrides or carboxylic esters. Suitable aliphatic or aromatic polyesters are, for example, condensates based on 1,2-ethanediol (ethylene glycol), 1,4-butanediol (1,4-butylene glycol), 1,6-hexanediol (1,6-hexamethylene glycol) and 2,2-dimethyl-1,3-propanediol (neopentyl glycol) with 1,6-hexanedioic acid (adipic acid) and 1,3-benzenedicarboxylic acid (isophthalic acid) (e.g. Bester grades from Poliolchimica). Preference is given to using linear or bifunctional aliphatic and/or aromatic polyester polyols having a mean molar mass (number average $M_n$) of from 1000 to 3000 dalton. Polycaprolactones (e.g.

Capa grades from Solvay Interox) and polycarbonates (e.g. Desmophen C 200 from Bayer) likewise belong to the group of polyesters. The former can be obtained by reacting phosgene or aliphatic or aromatic carbonates, e.g. diphenyl carbonate or diethyl carbonate, with dihydric or polyhydric alcohols. The latter can be prepared by polyaddition of lactones, e.g. ε-caprolactone, onto starter compounds having reactive hydrogen atoms, for example water, alcohols, amines or bisphenol A. Synthetic combinations of polyesters, polycaprolactones and polycarbonates are also conceivable. Macromonomers, telechelic polymers or epoxy resins are likewise suitable. The macromonomers and telechelic polymers are polyhydroxyolefins such as α,ω-dihydroxypolybutadienes, α,β-dihydroxy(meth)acrylates, α,ω-dihydroxy(meth)acrylates or α,ω-dihydroxypolysiloxanes. The epoxy resins are preferably derivatives of bisphenol A diglycidyl ether (BADGE).

The component (A) (ii) comprises at least one low molecular weight polyol having two or more hydroxyl groups which are reactive toward polyisocyanates and a molar mass of from 60 to 150 dalton. Suitable low molecular weight polyols are, for example, 1,2-ethanediol (ethylene glycol), 1,2-propanediol (1,2-propylene glycol), 1,3-propanediol (1,3-propylene glycol), 1,4-butanediol (1,4-butylene glycol), 1,6-hexanediol (1,6-hexamethylene glycol), 2-methyl-1,3-propanediol (trade name: MPDiol Glycol[7] from Arco Chemical), 2,2-dimethyl-1,3-propanediol (neopentyl glycol), 1,4-bis(hydroxymethyl)cyclohexane (cyclohexanedimethanol), 1,2,3-propanetriol (glycerol), 2-hydroxymethyl-2-methyl-1,3-propanol (trimethylolethane), 2-ethyl-2-hydroxymethyl-1,3-propanediol (trimethylolpropane) and/or 2,2-bis(hydroxymethyl)-1,3-propanediol (pentaerythritol).

The isocyanate component (B) comprises at least one polyisocyanate, polyisocyanate derivative and/or polyisocyanate homologue containing two or more aliphatic and/or aromatic isocyanate groups. Suitable compounds are, in particular, the polyisocyanates or combinations thereof which are adequately known from polyurethane chemistry. Aliphatic polyisocyanates which can be used are, for example, 1,6-diisocyanatohexane (HDI), 1-isocyanato-5-isocyanatomethyl-3,3,5-trimethylcyclohexane (IPDI), bis(4-isocyanatocyclohexyl)methane ($H_{12}$MDI), 1,3-bis(1-isocyanato-1-methylethyl)benzene (m-TMXDI) or industrial isomer mixtures of the individual aromatic polyisocyanates. Aromatic polyisocyanates which can be used are, for example, 2,4-diisocyanatotoluene (TDI), bis(4-isocyanatophenyl)methane (MDI) and possibly its higher homologues (polymeric MDI) or industrial isomer mixtures of the individual aromatic polyisocyanates. Furthermore, the "coatings polyisocyanates" based on, for example, bis(4-isocyanatocyclohexyl)methane ($H_{12}$MDI), 1,6-diisocyanatohexane (HDI), 1-isocyanato-5-isocyanatomethyl-3,3,5-trimethylcyclohexane (IPDI) are also suitable in principle. The term "coatings polyisocyanates" refers to derivatives of these diisocyanates which contain allophanate, biuret, carbodiimide, isocyanurate, uretdione and urethane groups and in which the residual content of monomeric diisocyanates has been reduced to a minimum in accordance with the prior art. It is also possible to use modified polyisocyanates which are obtainable, for example, by hydrophilic modification of "coatings polyisocyanates" based on 1,6-diisocyanatohexane (HDI). The aliphatic polyisocyanates are preferred over the aromatic polyisocyanates. Furthermore, preference is given to polyisocyanates having isocyanate groups of differing reactivity.

The reaction conditions in the reaction step a) are relatively noncritical. The polyurethane preadduct is preferably formed by adding or metering the component (B) to/into the mixture of the components (A) (i) and, if used, (A) (ii) over a period of from a few minutes to a few hours or, as an alternative, adding or metering the mixture of the component (A) (i) and, if used, (A) (ii) to/into the component (B) over a period of from a few minutes to a few hours.

The preferred NCO/OH equivalent ratio of the components (B) (polyisocyanates) and (A) (polyols) is from 1.5 to 2.5, but in particular from 1.8 to 2.2. The reaction mixture is stirred at from 60 to 120° C., but preferably at from 80 to 100° C., under an inert gas atmosphere utilizing the exothermic nature of the polyaddition reaction until the calculated or theoretical NCO content has been reached. The reaction times required are usually in the region of a few hours and are influenced by reaction parameters such as the reactivity of the components used in the particular case and their stoichiometry and also the temperature.

The reaction of the components (A) and (B) in reaction step a) can be carried out in the presence of a catalyst system customary for polyaddition reactions onto polyisocyanates. If necessary, these catalysts are added in sufficient amounts of, for example, from 0.01 to 1% by weight, based on the components (A) and (B). Customary catalysts for polyaddition reactions onto polyisocyanates are, for example, dibutyltin oxide, dibutyltin dilaurate (DBTL), triethylamine, tin(II) octoate, 1,4-diazabicyclo[2.2.2]octane (DABCO), 1,4-diazabicyclo[3.2.0]-5-nonene (DBN) and 1,5-diazabicyclo[5.4.0]-7-undecene (DBU).

In the subsequent reaction step b), the polyurethane preadduct from step a) is reacted with the component A (iii) to form the corresponding prepolymer, with the component (A) (iii) being used in a proportion of from 0.5 to 5% by weight. The polyol component (A) (iii) is preferably added or metered as a finely milled powder having a particle size of <150 μm to/into the polyurethane preadduct from step a) over a period of from a few minutes to a few hours.

The component (A) (iii) comprises at least one low molecular weight and anionically modifiable polyol containing at least two hydroxyl groups which are reactive toward polyisocyanates and at least one carboxyl group which is inert toward polyisocyanates and can be converted completely or partially into carboxylate groups in the presence of bases. Low molecular weight and anionically modifiable polyols which can be used are, for example, 2-hydroxymethyl-3-hydroxypropanoic acid (dimethylolacetic acid), 2-hydroxymethyl-2-methyl-3-hydroxypropanoic acid (dimethylolpropionic acid), 2-hydroxymethyl-2-ethyl-3-hydroxypropanoic acid (dimethylolbutyric acid), 2-hydroxymethyl-2-propyl-3-hydroxypropanoic acid (dimethylolvaleric acid), citric acid and/or tartaric acid. Preference is given to using bishydroxyalkane-carboxylic acids and particularly preferably 2-hydroxymethyl-2-methyl-3-hydroxypropanoic acid (trade name: DMPA® from Mallinckrodt). Furthermore, the component A (iii) preferably has a molar mass of from 100 to 200 dalton.

Polyaddition reactions for the preparation of such polyurethane prepolymers require high NCO/OH equivalent ratios, i.e. ratios of the component (B) to the component (A) of, in particular, from 1.5 to 2.5, preferably from 1.8 to 2.2. Furthermore, preference is given to using polyisocyanates having isocyanate groups of differing reactivity so as to obtain narrower molar mass distributions with a lower nonuniformity. Preference is accordingly given to polyurethane prepolymers which have a linear structure and are composed of bifunctional polyol and polyisocyanate components.

The preparation of the prepolymers corresponding to reaction step b) is preferably carried out at temperatures of from 60 to 120° C., in particular from 80 to 100° C.

The viscosity of the polyurethane prepolymers is relatively low and largely independent of the structure of the polyol and polyisocyanate components used. Addition of solvents to reduce the viscosity or to improve the dispersion properties of the polyurethane prepolymers is therefore not necessary. The particular structure of the prepolymers makes it possible to prepare products having extraordinarily high solids contents. In addition, owing to the uniform distribution of the carboxyl or carboxylate groups over the polyurethane polymer, only low charge densities are required for stabilizing the corresponding polyurethane dispersions.

In the subsequent reaction step c), the polyurethane prepolymer from step b) is reacted with from 0.25 to 2.5% by weight of a neutralization component (C) to completely or partially neutralize the carboxyl groups (—COOH) (direct neutralization). The neutralization component (C) is preferably present in such an amount that the degree of neutralization based on the free carboxyl groups of the polyurethane prepolymer is from 70 to 100 equivalent-%, preferably from 80 to 90 equivalent-%. In the neutralization, the carboxyl groups are converted into carboxylate groups (—COO⁻) which serve to anionically modify or stabilize the polyurethane dispersion. The reaction step c) is carried out at a temperature of from 40 to 60° C., preferably at about 50° C. As an alternative, the neutralization component (C) can also be added to the dispersion medium in step d).

The neutralization component (C) comprises one or more bases which are suitable for the complete or partial neutralization of carboxyl groups. Suitable bases are tertiary amines such as N,N-dimethylethanolamine, N-methyldiethanolamine, triethanolamine, N,N-dimethylisopropanolamine, N-methyldiisopropanolamine, triisopropylamine, N-methylmorpholine, N-ethylmorpholine, triethylamine, ammonia or alkali metal hydroxides such as lithium hydroxide, sodium hydroxide or potassium hydroxide. Preference is given to using tertiary amines, particularly triethylamine.

In the subsequent reaction step d), the neutralized polyurethane prepolymer from step c) is dispersed in from 10 to 60% by weight of water which may contain from 10 to 70% by weight of a formulation component (F) selected from among fillers, pigments, plasticizers, fibrous materials, dispersants, Theological aids, antifoams, adhesion promoters, antifreezes, flame retardants, bactericides, fungicides, preservatives and/or further polymers or polymer dispersions.

In the dispersion step, the neutralized polyurethane prepolymer is transferred into the dispersion medium, forming a polyurethane prepolymer dispersion. The neutralized polyurethane prepolymer predominantly forms micelles which have stabilizing carboxylate groups on the surface and reactive isocyanate groups in the interior. All cationic counterions to the anionic carboxylate groups are dissolved in the dispersion medium. The terms "dispersion step" and "dispersion" allow for solvated and/or suspended components to be present in addition to dispersed components having a micelle structure. For the transfer of the polyurethane prepolymer into the aqueous phase, it is possible either to stir the polyurethane prepolymer into the dispersion medium or to stir the dispersion medium into the polyurethane prepolymer. The reaction step d) is carried out at a temperature of from 30 to 50° C., preferably at about 40° C.

There are further alternatives to the procedure described. The steps c) and d) can be combined by adding the neutralization component (C) to the water in which the unneutralized polyurethane prepolymer is dispersed in the manner of reaction step d) (indirect neutralization). Some or all of the formulation component (F) can be stirred into the polyurethane prepolymer before dispersing it in reaction step d), as long as this does not adversely affect the preparation process.

The polyurethane prepolymer dispersion from step d) is reacted in the subsequent reaction step e) with from 0.25 to 2.5% by weight of a chain extension component (D) and, if desired, in reaction step f) with from 0.05 to 0.5% by weight of a chain stopper component (E).

The chain extension component (D) comprises at least one polyamine having two or more amino groups which are reactive toward polyisocyanates. Suitable polyamines are, for example, adipic acid dihydrazide, ethylenediamine, diethylenetriamine, triethylenetetramine, tetraethylenepentamine, pentaethylenehexamine, dipropylenetriamine, hexamethylenediamine, hydrazine, isophoronediamine, N-(2-aminoethyl)-2-aminoethanol, adducts of salts of 2-acrylamido-2-methylpropane-1-sulfonic acid (AMPS) and ethylenediamine or any combinations of these polyamines. Preference is given to using bifunctional primary amines, in particular 1,2-diaminoethane (ethylenediamine).

The chain stopper component (E) comprises at least one monoamine having an amino group which is reactive toward polyisocyanates. Suitable monoamines are, for example, ethylamine, diethylamine, n-propylamine, di-n-propylamine, isopropylamine, diisopropylamine, n-butylamine, di-n-butylamine, ethanolamine, diethanolamine, isopropanolamine, diisopropanolamine, morpholine, piperidine, pyrrolidine or any combination of these polyamines. Preference is given to using monofunctional primary amines, in particular 2-aminopropane (isopropylamine).

In a preferred embodiment, the chain extension component (D) is used in such an amount that the degree of chain extension based on the free isocyanate groups of the polyurethane prepolymer is from 50 to 100 equivalent-%, preferably from 70 to 80 equivalent-%. The chain stopper component (E) is, if used, employed in such an amount that the degree of chain stopping based on the free isocyanate groups of the polyurethane prepolymer is from 1 to 20 equivalent-%, preferably from 5 to 10 equivalent-%. When using the chain extension component (D) and the chain stopper component (E), the components can be added either in succession or simultaneously or as a mixture to the polyurethane prepolymer dispersion from step d). The chain extension of the polyurethane prepolymer dispersion leads to an increase in the molar mass of the polyurethane-polyurea molecules within the micelles and thus to an increase in the average molar mass in the polyurethane-polyurea dispersion. The chain extension component (D) reacts with reactive isocyanate groups significantly faster than water. The chain stopping of the polyurethane prepolymer dispersion leads to termination of the buildup of the molar mass and thus to a reduction in the average molar mass. The chain stopper component (E) reacts with reactive isocyanate groups significantly faster than water. Variation of the amount of chain stopper component and/or the point at which it is added to the dispersion enables the average molar mass to be regulated. Subsequent to the reaction steps e) and f), any free isocyanate groups still present can be completely chain-extended by means of water.

The solids content of polyurethane polymer is set to, in particular, from 40 to 70% by weight, preferably from 50 to 60% by weight, based on the total amount of the pure polyurethane dispersion (polyurethane polymer plus water). The solids content of polyurethane polymer is preferably from 10 to 50% by weight, in particular from 20 to 40% by weight, and the solids content of fillers is from 10 to 70% by weight, in particular from 20 to 60% by weight, based on the total amount of the polyurethane dispersion formulated in situ (polyurethane polymer plus formulation component(s) plus water).

The content of carboxylate groups in the polyurethane polymer is preferably set to from 10 to 50 meq.$(100\ g)^{-1}$, in particular from 15 to 35 meq.$(100\ g)^{-1}$.

The mean particle size of the micelles of the polyurethane polymer is preferably from 100 to 500 nm, in particular from 200 to 400 nm. These figures are based on measurements using photon correlation spectroscopy (PCS).

The polyurethane polymer generally has a mean molar mass of from 25,000 to 100,000 dalton. These figures are based on the number average $M_n$ and measurements using gel permeation chromatography (GPC).

The process used according to the invention, which will hereinafter also be referred to as the high solids zero VOC process, represents a universal method for preparing tailored polyurethane dispersions. The low engineering requirements of the process and the complete omission of volatile and/or nonvolatile organic solvents make it possible to achieve high space-time yields at low cost. The process combines the advantages of the prepolymer mixing process and the solvent process. In addition, the reproducibility of the process and the shelf life of the products deserve emphasis. For a preparation on the industrial scale, only a simple polymerization apparatus comprising a stirred vessel and a high-speed mixer are required. This configuration corresponds to the prepolymer mixing process.

The performance of the polyurethane dispersions of the invention in respect of freedom from solvents, solids content and materials properties nevertheless achieves the standard of products based on the solvent process.

In the polyurethane dispersions formulated in situ, extraordinarily high solids contents are achieved at comparatively low viscosities of preferably from 10 to 800 mpas, which would not have been possible using a conventional formulation procedure for pure polyurethane dispersions. In addition, a conventional formulation procedure frequently requires prior moistening of the filler component in order to prevent destabilization of the polyurethane dispersion as a result of adsorptive effects. This makes the formulation procedure more complicated and may further increase the water content of the formulation. The process proposed according to the invention enables these problems to be circumvented in an elegant way. In this process, the formulation procedure for the polyurethane dispersion is fully integrated into the synthesis process of the high solids zero VOC process.

The invention therefore also provides a process for preparing the solvent-free polyurethane dispersions of the invention.

The polyurethane dispersions of the invention can be used in the building sector as single-component, isocyanate-free and solvent-free binders or finished products. These building applications are coatings, sealants, adhesives, paints and varnishes or membranes for the surfaces of mineral building materials such as concrete, gypsum or cement and also glass, wood, paper, metal or plastic. The polyurethane dispersions of the invention are applied using the methods known from surface coatings technology, e.g. flooding, pouring, doctor blade coating, spraying, painting, dipping or rolling.

The materials properties of the polyurethane films produced from the polyurethane dispersions are excellent. The ideal linear segmented structure of the polyurethane polymers results in a very pronounced and regular intermolecular domain structure made up of hard segments and soft segments. Hard segments comprise structural elements having rigid urethane and urea groups which exercise a strong interchain interaction. Soft segments comprise flexible structural elements having carbonate, ester and ether groups which exercise a weak interchain interaction.

The polyurethane dispersions of the invention have extraordinarily high solids contents combined with comparatively low viscosities, complete freedom from solvents, excellent materials properties (e.g. elasticity, elongation and tensile strength) and a technically simple method of preparation.

The following examples illustrate the invention.

EXAMPLE 1

Solvent-free Polyurethane Dispersion Having a High Solids Content Based on a Polypropylene Glycol Having a Molar Mass of 3000 Dalton In a four-neck flask provided with precision glass stirrer, reflux condenser, thermometer and nitrogen blanketing, a mixture of 300.00 g of a polypropylene glycol having a hydroxyl number of 37.4 mg KOH.$g^{-1}$ (trade name: Voranol P3000 from Dow) and 80.25 g of isophorone diisocyanate (trade name: Vestanate IPDI from Hüls) was stirred at 80–90° C. for 2 hours under a blanket of nitrogen. After addition of 10.80 g of finely milled dimethylolpropionic acid (trade name: DMPA from Mallinckrodt) to the preadduct, the mixture was stirred further at 80–90° C. under a blanket of nitrogen until the calculated NCO content had been reached (NCO/OH=2.00). The course of the reaction was followed acidimetrically. After the polyaddition reaction was complete, an NCO content of 3.91% by weight (theoretical: 3.88% by weight) was found. After cooling to 50° C., the prepolymer was directly neutralized with 90 equivalent-% of triethylamine.

Variant A 130.00 g of the prepolymer were then dispersed in 108.68 g of demineralized water by intensive stirring and subsequently chain extended using 80 equivalent-% of ethylenediamine to form the polyurethane dispersion. A stable polyurethane dispersion having the following characteristics was obtained:

| | |
|---|---|
| Appearance | Milky white liquid |
| Solids content | About 60% by weight |
| pH | 7.47 |
| Brookfield viscosity | 254 mPa · s (20° C.) |
| Mean particle size | 345 nm |

Variant B 130.00 g of the prepolymer were then dispersed in 108.82 g of demineralized water by intensive stirring and subsequently chain extended using 75 equivalent-% of ethylenediamine and chain stopped using 5 equivalent-% of isopropylamine to form the polyurethane dispersion. A stable polyurethane dispersion having the following characteristics was obtained:

| | |
|---|---|
| Appearance | Milky white liquid |
| Solids content | About 60% by weight |
| pH | 7.4 |
| Brookfield viscosity | 50 mPa · s (20° C.) |
| Mean particle size | 216 nm |

Variant C 130.00 g of the prepolymer were then dispersed in 109.02 g of demineralized water by intensive stirring and subsequently chain extended using 70 equivalent-% of ethylenediamine and chain stopped using 10 equivalent-% of isopropylamine to form the polyurethane dispersion. A stable polyurethane dispersion having the following characteristics was obtained:

| | |
|---|---|
| Appearance | Milky white liquid |
| Solids content | About 60% by weight |
| pH | 7.6 |
| Brookfield viscosity | 700 mPa · s (20° C.) |
| Mean particle size | 261 nm |

EXAMPLE 2

Solvent-free Polyurethane Dispersion Having a High Solids Content Based on Polypropylene Glycols Having Molar Masses of 3000 and 4000 Dalton In a four-neck flask provided with precision glass stirrer, reflux condenser, thermometer and nitrogen blanketing, a mixture of 180.00 g of a polypropylene glycol having a hydroxyl number of 37.4 mg KOH.g$^{-1}$ (trade name: Voranol P3000 from Dow), 20.00 g of a polypropylene glycol having a hydroxyl number of 28.05 mg KOH.g$^{-1}$ (trade name: Voranol P4000 from Dow) and 52.76 g of isophorone diisocyanate (trade name: Vestanat IPDI from Hüls) was stirred at 80–90° C. for 2 hours under a blanket of nitrogen.

After addition of 7.20 g of finely milled dimethylolpropionic acid (trade name: DMPA from Mallinckrodt) to the preadduct, the mixture was stirred further at 80–90° C. under a blanket of nitrogen until the calculated NCO content had been reached (NCO/OH=2.00). The course of the reaction was followed acidimetrically. After the polyaddition reaction was complete, an NCO content of 3.89% by weight (theoretical: 3.84% by weight) was found.

Variant A

After cooling to 50° C., 129.98 g of the prepolymer were directly neutralized with 90 equivalent-% of triethylamine. 130.00 g of the prepolymer were then dispersed in 108.66 g of demineralized water by intensive stirring and subsequently chain extended using 80 equivalent-% of ethylenediamine to form the polyurethane dispersion. A stable polyurethane dispersion having the following characteristics was obtained:

| | |
|---|---|
| Appearance | Milky white liquid |
| Solids content | About 60% by weight |
| pH | 7.3 |
| Brookfield viscosity | 360 mPa · s (20° C.) |
| Mean particle size | 329 nm |

Variant B

After cooling to 50° C., 129.98 g of the prepolymer were directly neutralized with 80 equivalent-% of triethylamine. 130.00 g of the prepolymer were then dispersed in 108.66 g of demineralized water by intensive stirring and subsequently chain extended using 80 equivalent-% of ethylenediamine to form the polyurethane dispersion. A stable polyurethane dispersion having the following characteristics was obtained:

| | |
|---|---|
| Appearance | Milky white liquid |
| Solids content | About 60% by weight |
| pH | 7.3 |
| Brookfield viscosity | 180 mPa · s (20° C.) |
| Mean particle size | 446 nm |

EXAMPLE 3

Solvent-free Polyurethane Dispersion Having a High Solids Content Based on Polypropylene Glycol Having a Molar Mass of 2000

In a four-neck flask provided with precision glass stirrer, reflux condenser, thermometer and nitrogen blanketing, a mixture of 100.00 g of a polypropylene glycol having a hydroxyl number of 56.1 mg KOH.g$^{-1}$ (trade name: Voranol P2000 from Dow) and 35.49 g of isophorone diisocyanate (trade name: Vestanat IPDI from Hüls) was stirred at 80–90° C. for 2 hours under a blanket of nitrogen.

After addition of 4.00 g of finely milled dimethylolpropionic acid (trade name: DMPA from Mallinckrodt) to the preadduct, the mixture was stirred further at 80–90° C. under a blanket of nitrogen until the calculated NCO content had been reached (NCO/OH=2.00). The course of the reaction was followed acidimetrically. After the polyaddition reaction was complete, an NCO content of 4.86% by weight (theoretical: 4.81% by weight) was found.

After cooling to 50° C., the prepolymer was directly neutralized with 90 equivalent-% of triethylamine. 140.00 g of the prepolymer were then dispersed in 95.85 g of demineralized water by intensive stirring and subsequently chain extended using 80 equivalent-% of ethylenediamine to form the polyurethane dispersion. A stable polyurethane dispersion having the following characteristics was obtained:

| | |
|---|---|
| Appearance | Milky white liquid |
| Solids content | About 60% by weight |
| pH | 7.41 |
| Brookfield viscosity | 75 mPa · s (20° C.) |
| Mean particle size | 309 nm |

EXAMPLE 4

Solvent-free Polyurethane Dispersion Having a High Solids Content Based on Polypropylene Glycol Having a Molar Mass of 1000

In a four-neck flask provided with precision glass stirrer, reflux condenser, thermometer and nitrogen blanketing, a mixture of 100.00 g of a polypropylene glycol having a hydroxyl number of 112.2 mg KOH.g$^{-1}$ (trade name: Voranol P1000 from Dow) and 59.39 g of isophorone diisocyanate (trade name: Vestanat IPDI from Hüls) was stirred at 80–90° C. for 2 hours under a blanket of nitrogen. After addition of 4.50 g of finely milled dimethylolpropionic acid (trade name: DMPA from Mallinckrodt) to the preadduct, the mixture was stirred further at 80–90° C. under a blanket of nitrogen until the calculated NCO content had been reached (NCO/OH=2.00). The course of the reaction was followed acidimetrically. After the polyaddition reaction was complete, an NCO content of 6.88% by weight (theoretical: 6.85% by weight) was found.

After cooling to 50° C., the prepolymer was directly neutralized with 90 equivalent-% of triethylamine. 160.00 g of the prepolymer were then dispersed in 110.77 g of demineralized water by intensive stirring and subsequently chain extended using 80 equivalent-% of ethylenediamine to form the polyurethane dispersion. A stable polyurethane dispersion having the following characteristics was obtained:

| | |
|---|---|
| Appearance | Milky white liquid |
| Solids content | About 60% by weight |
| pH | 6.90 |
| Brookfield viscosity | 40 mPa · s (20° C.) |
| Mean particle size | 339 nm |

EXAMPLE 5

Solvent-free Polyurethane Dispersion Having a High Solids Content Based on a Polytetrahydrofuran Having a Molar Mass of 2000 Dalton In a four-neck flask provided with precision glass stirrer, reflux condenser, thermometer and nitrogen blanketing, a mixture of 100.00 g of an aliphatic polytetrahydrofuran having a hydroxyl number of 56.1 mg KOH.g$^{-1}$ (trade name: PolyTHF 2000 from BASF) and 38.81 g of isophorone diisocyanate (trade name: Vestanat IPDI from Hüls) was stirred at 80–90° C. for 2 hours under a blanket of nitrogen. After addition of 5.00 g of finely milled dimethylolpropionic acid (trade name: DMPA from Mallinckrodt) to the preadduct, the mixture was stirred further at 80–90° C. under a blanket of nitrogen until the calculated NCO content had been reached (NCO/OH=2.00). The course of the reaction was followed acidimetrically. After the polyaddition reaction was complete, an NCO content of 5.15% by weight (theoretical: 5.10% by weight) was found. After cooling to 50° C., the prepolymer was directly neutralized with 90 equivalent-% of triethylamine. 145.00 g of the prepolymer were then dispersed in 99.38 g of demineralized water by intensive stirring and subsequently chain extended using 80 equivalent-% of ethylenediamine to form the polyurethane dispersion. A stable polyurethane dispersion having the following characteristics was obtained:

| | |
|---|---|
| Appearance | Milky white liquid |
| Solids content | About 60% by weight |
| pH | 7.4 |
| Brookfield viscosity | 12 mPa · s (20° C.) |
| Mean particle size | 314 nm |

TABLE 1

Mechanical properties of polyurethane films based on Examples 1 to 5

| | Example | | | | | | | |
|---|---|---|---|---|---|---|---|---|
| | 1A | 1B | 1C | 2A | 2B | 3 | 4 | 5 |
| Stress at 100% elongation $\sigma_{100}$ | 1.9 MPa | 1.1 MPa | 0.8 MPa | 1.3 MPa | 2.1 MPa | 3.1 MPa | 6.8 MPa | 9.1 MPa |
| Stress at 300% elongation $\sigma_{300}$ | 4.1 MPa | 2.2 MPa | 1.6 MPa | 2.6 MPa | 4.3 MPa | 6.5 MPa | 15.6 MPa | 24.4 MPa |
| Stress at 500% elongation $\sigma_{500}$ | 5.7 MPa | 2.9 MPa | 1.8 MPa | 3.6 MPa | 5.9 MPa | 10.8 MPa | — | — |
| Tensile strength $\sigma_M$ | 12.2 MPa | 4.9 MPa | 2.2 MPa | 7.8 MPa | 12.1 MPa | 23.6 MPa | 40.8 MPa | 29.8 MPa |
| Elongation at the tensile strength $\sigma_M$ | 968% | 1363% | 1032% | 1082% | 967% | 705% | 469% | 326% |

TABLE 2

Examples 6 to 11
Solvent-free polyurethane dispersions having a high solids content based on various polyester polyols
The preparation was carried out using a method analogous to Example 5

| Example | 6 | 7 | 8 | 9 | 10 | 11 |
|---|---|---|---|---|---|---|
| Polymeric polyol | 1) | 2) | 3) | 4) | 5) | 6) |
| OH number | 55.4 mg KOH.g$^{-1}$ | 54.5 mg KOH.g$^{-1}$ | 55.5 mg KOH.g$^{-1}$ | 56.2 mg KOH.g$^{-1}$ | 56.1 mg KOH.g$^{-1}$ | 56.1 mg KOH.g$^{-1}$ |
| DMPA | 7.25 g | 8.35 g | 7.00 g | 7.00 g | 7.50 g | 7.50 g |
| NCO/OH | 2.00 | 2.00 | 2.00 | 2.00 | 2.00 | 2.00 |
| NCO content theoretical/found | 5.72/5.79% by weight | 5.91/5.98% by weight | 5.61/5.67% by weight | 5.64/5.72% by weight | 5.76/5.79% by weight | 5.76/5.79% by weight |
| Appearance | Milky white liquid | Milky white liquid | Milky white liquid | Milky white liquid | Milky white liquid | Milky white liquid |

TABLE 2-continued

Examples 6 to 11
Solvent-free polyurethane dispersions having a high solids content based on various polyester polyols
The preparation was carried out using a method analogous to Example 5

| Example | 6 | 7 | 8 | 9 | 10 | 11 |
|---|---|---|---|---|---|---|
| Solids content | About 60% by weight | About 60% by weight | About 60% by weight | About 60% by weight | About 60% by weight | About 60% by weight |
| pH | 7.4 | 7.2 | 6.8 | 6.7 | 7.1 | 7.0 |
| Brookfield viscosity | 150 mPa.s (20° C.) | 350 mPa.s (20° C.) | 21 mPa.s (20° C.) | 14 mPa.s (20° C.) | 35 mPa.s (20° C.) | 6 mPa.s (20° C.) |
| Mean particle size | 266 nm | 231 nm | 158 nm | 253 nm | 180 nm | 232 nm |

1) Bester 42 H from Poliolchimica (polyester based on adipic acid, ethylene glycol, 1,4-butanediol)
2) Bester SL-703 from Poliochimica (polyester based on adipic acid, isophthalic acid, 1,6-hexanediol)
3) Bester 80 from Poliochimica (polyester based on adipic acid, 1,4-butanediol)
4) Bester 121 from Poliochimica (polyester based on adipic acid, 1,6-hexanediol)
5) PCL 2000, laboratory product (polycaprolactone based on ε-caprolactone, 1.6-hexanedhiol)
6) Desmophen C 200 from Bayer (polycarbonate based on diphenyl carbonate, 1,6-hexanediol)

TABLE 3

Mechanical properties of polyurethane films based on Examples 6 to 11

| Example | 6 | 7 | 8 | 9 | 10 | 11 |
|---|---|---|---|---|---|---|
| Stress at 100% elongation $\sigma_{100}$ | 9.2 MPa | 10.8 MPa | 11.5 MPa 12.8 MPa* | 15.6 MPa 15.2 MPa | 7.0 MPa | 13.6 MPa |
| Stress at 300% elongation $\sigma_{300}$ | 21.7 MPa | 28.0 MPa | 37.9 MPa 43.2 MPa* | — — | 15.8 MPa | — |
| Tensile strength $\sigma_M$ | 44.4 MPa | 36.1 MPa | 39.0 MPa 50.0 MPa* | 30.1 MPa 33.5 MPa | 30.7 MPa | 24.9 MPa |
| Elongation at the tensile strength ($\epsilon_M$) | 413% | 335% | 305% 323%* | 358% 359% | 456% | 315% |

*After activation at 80° C.

Table 4 and Comparative Examples A to H
Conventional solvent-containing polyurethane dispersions from SKW based on various polymeric polyols
(Solids content: about 40% by weight, solvent content: about 5–7% by weight of N-methylpyrrolidone)

| | Comparative Example | | | | | | | |
|---|---|---|---|---|---|---|---|---|
| | A | B | C | D | E | F | G | H |
| Analogous to polyol from example | 3 | 5 | 6 | 7 | 8 | 9 | 10 | 11 |
| DMPA/100 g of polyol | 7.00 g | 8.00 g | 9.00 g | 8.00 g | 9.00 g | 9.00 g | 8.50 g | 8.50 g |
| Stress at 100% elongation $\sigma_{100}$ | 7.0 MPa | 2.6 MPa | 7.1 MPa | 6.4 MPa | 7.2 MPa 13.1 MPa* | 4.6 MPa 6.4 MPa* | 2.5 MPa | 6.2 MPa |
| Tensile strength σM | 17.9 MPa | 4.2 MPa | 18.5 MPa | 20.3 MPa | 20.1 MPa 35.1 MPa* | 8.3 MPa 26.3 MPa | 12.3 MPa | 16.9 MPa |
| Elongation at the tensile strength ($\epsilon_M$) | 410% | 284% | 320% | 283% | 282% 281%* | 261% 277%* | 434% | 267% |

*After activation at 80° C.

EXAMPLE 12

Solvent-free Polyurethane Dispersions Formulated in situ Having a High Solids Content Based on a Polypropylene Glycol Having a Molar Mass of 3000 Dalton The synthesis of the prepolymer was carried out by a method analogous to Example 1

Variant A 100.00 g of the prepolymer were then dispersed in a previously prepared mixture of 70.00 g of demineralized water, 120.00 g of Durcal 10 (from Omya), 80.00 g of Barytmehl N (from Sachtleben Chemie) and 0.25 g of Narlex LD 36 V (from National Starch) by intensive stirring and subsequently chain extended using 80 equivalent-% of ethylenediamine to form the polyurethane dispersion.

Variants B, C and D

The preparation was carried out by a method analogous to variant A, but using 80.00 g (variant B), 90.00 g (variant C) or 100.00 g (variant D) of demineralized water.

Stable polyurethane dispersions formulated in situ having the following characteristics were obtained:

| Variant | Solids content | Brookfield viscosity |
|---|---|---|
| A | About 81% by weight | 1500 mPa.s (20° C.) |
| B | About 79% by weight | 500 mPa.s (20° C.) |
| C | About 77% by weight | 200 mPa.s (20° C.) |
| D | About 75% by weight | 60 mPa.s (20° C.) |

EXAMPLE 13

Solvent-free Polyurethane Dispersions Formulated in situ Having a High Solids Content Based on a Polypropylene Glycol Having a Molar Mass of 3000 Dalton The synthesis of the prepolymer was carried out by a method analogous to Example 1.
Variant A1
100.00 g of the prepolymer were then dispersed in a previously prepared mixture of 70.00 g of demineralized water, 120.00 g of Durcal 10 (from Omya), 80.00 g of Barytmehl N (from Sachtleben Chemie) and 0.25 g of Narlex LD 36 V (from National Starch) by intensive stirring and subsequently chain extended using 75 equivalent-% of ethylenediamine and chain stopped using 5 equivalent-% of isopropylamine to form the polyurethane dispersion.
Variants B1, C1 and D1
The preparation was carried out by a method analogous to variant A1, but using 80.00 g (variant B1), 90.00 g (variant C1) or 100.00 g (variant D1) of demineralized water.
Variants A2, B2, C2 and D2
The preparation was carried out by a method analogous to variants A1–D1, but 0.60 g of Tylose H 300 P (from Hoechst) were additionally added to the dispersion medium before the dispersion step.
Stable polyurethane dispersions formulated in situ having the following characteristics were obtained:

| Variant | Solids content | Brookfield viscosity |
|---|---|---|
| A1 | About 81% by weight | 1100 mPa.s (20° C.) |
| B1 | About 79% by weight | 550 mPa.s (20° C.) |
| C1 | About 77% by weight | 150 mPa.s (20° C.) |
| D1 | About 75% by weight | 60 mPa.s (20° C.) |
| A2 | About 81% by weight | 16,000 mPa.s (20° C.) |
| B2 | About 79% by weight | 8000 mPa.s (20° C.) |
| C2 | About 77% by weight | 3800 mPa.s (20° C.) |
| D2 | About 75% by weight | 2200 mPa.s (20° C.) |

EXAMPLE 14

Solvent-free Polyurethane Dispersions Formulated in situ Having a High Solids Content Based on Polypropylene Glycols Having Molar Masses of 3000 and 4000 Dalton The synthesis of the prepolymer was carried out by a method analogous to Example 2.
Variant A
After cooling to 50° C., 129.98 g of the prepolymer were directly neutralized with 90 equivalent-% of triethylamine.
100.00 g of the prepolymer were then dispersed in a previously prepared mixture of 70.00 g of demineralized water, 120.00 g of Durcal 10 (from Omya), 80.00 g of Barytmehl N (from Sachtleben Chemie) and 0.25 g of Narlex LD 36 V (from National Starch) by intensive stirring and subsequently chain extended using 80 equivalent-% of ethylenediamine to form the polyurethane dispersion.
Variants B, C and D
The preparation was carried out by a method analogous to variant A, but using 80.00 g (variant B), 90.00 g (variant C) or 100.00 g (variant D) of demineralized water.
Stable polyurethane dispersions formulated in situ having the following characteristics were obtained:

| Variant | Solids content | Brookfield viscosity |
|---|---|---|
| A | About 81% by weight | 1100 mPa.s (20° C.) |
| B | About 79% by weight | 1100 mPa.s (20° C.) |
| C | About 77% by weight | 400 mPa.s (20° C.) |
| D | About 75% by weight | 200 mPa.s (20° C.) |

EXAMPLE 15

Solvent-free Polyurethane Dispersions Formulated in situ Having a High Solids Content Based on Polypropylene Glycols Having Molar Masses of 3000 and 4000 Dalton The synthesis of the prepolymer was carried out by a method analogous to Example 2.
Variant A1
After cooling to 50° C., 129.98 g of the prepolymer were directly neutralized with 80 equivalent-% of triethylamine.
100.00 g of the prepolymer were then dispersed in a previously prepared mixture of 70.00 g of demineralized water, 120.00 g of Durcal 10 (from Omya), 80.00 g of Barytmehl N (from Sachtleben Chemie) and 0.25 g of Narlex LD 36 V (from National Starch) by intensive stirring and subsequently chain extended using 80 equivalent-% of ethylenediamine to form the polyurethane dispersion.
Variants B1, C1 and D1
The preparation was carried out by a method analogous to variant A1, but using 80.00 g (variant B1), 90.00 g (variant C1) or 100.00 g (variant D1) of demineralized water.
Variants A2, B2, C2 and D2
The preparation was carried out by a method analogous to variants A1 to D1, but 0.60 g of Tylose H 300 P (from Hoechst) were additionally added to the dispersion medium before the dispersion step. Stable polyurethane dispersions formulated in situ having the following characteristics were obtained:

| Variant | Solids content | Brookfield viscosity |
|---|---|---|
| A1 | About 81% by weight | 2000 mPa.s (20° C.) |
| B1 | About 79% by weight | 500 mPa.s (20° C.) |
| C1 | About 77% by weight | 100 mPa.s (20° C.) |
| D1 | About 75% by weight | 25 mPa.s (20° C.) |
| A2 | About 81% by weight | 16,000 mPa.s (20° C.) |
| B2 | About 79% by weight | 6000 mPa.s (20° C.) |
| C2 | About 77% by weight | 3000 mPa.s (20° C.) |
| D2 | About 75% by weight | 2000 mPa.s (20° C.) |

EXAMPLE 16

Solvent-free Polyurethane Dispersions Formulated in situ Having a High Solids Content Based on a Polypropylene Glycol Having a Molar Mass of 2000 Dalton The synthesis of the prepolymer was carried out by a method analogous to Example 3.

Variant A 100.00 g of the prepolymer were then dispersed in a previously prepared mixture of 70.00 g of demineralized water, 120.00 g of Durcal 10 (from Omya), 80.00 g of Barytmehl N (from Sachtleben Chemie) and 0.25 g of Narlex LD 36 V (from National Starch) by intensive stirring and subsequently chain extended using 80 equivalent-% of ethylenediamine to form the polyurethane dispersion.

Variants B, C and D

The preparation was carried out by a method analogous to variant A, but using 80.00 g (variant C), 90.00 g (variant C) or 100.00 g (variant D) of demineralized water. Stable polyurethane dispersions formulated in situ having the following characteristics were obtained:

TABLE 5

| Variant | Solids content | Brookfield viscosity |
|---|---|---|
| A | About 81% by weight | 12,000 mPa.s (20° C.) |
| B | About 79% by weight | 3600 mPa.s (20° C.) |
| C | About 77% by weight | 400 mPa.s (20° C.) |
| D | About 75% by weight | 200 mPa.s (20° C.) |

1' Mechanical properties of polyurethane films formulated in situ based on Examples 12–16

| Example | Tensile strength $\sigma_M$ | Elongation at the tensile strength $\epsilon_M$ |
|---|---|---|
| 12 A | 5.3 MPa | 46% |
| 13 A1 | 5.5 MPa | 56% |
| 13 A2 | 5.0 MPa | 44% |
| 14 A | 6.2 MPa | 50% |
| 15 A1 | 5.7 MPa | 48% |
| 15 A2 | 5.3 MPa | 40% |
| 16 A | 7.8 MPa | 16% |

EXAMPLE 17

Solvent-free Polyurethane Dispersions Formulated in situ Having a High Solids Content Based on Polypropylene Glycols Having Molar Masses of 3000 and 4000 Dalton The synthesis of the prepolymer was carried out by a method analogous to Example 2.

Variant A

After cooling to 50° C., 129.98 g of the prepolymer were directly neutralized with 90 equivalent-% of triethylamine.

120.00 g of the prepolymer were then dispersed in a previously prepared mixture of 110.00 g of demineralized water, 150.00 g of titanium dioxide (trade name: TiONa® from SCM Chemicals) and 0.40 g of Narlex LD 36 V (from National Starch) by intensive stirring and subsequently chain extended using 80 equivalent-% of ethylenediamine to form the polyurethane dispersion.

Variant B

After cooling to 50° C., 129.98 g of the prepolymer were directly neutralized with 80 equivalent-% of triethylamine.

120.00 g of the prepolymer were then dispersed in a previously prepared mixture of 110.00 g of demineralized water, 150.00 g of titanium dioxide (trade name: TiONa® from SCM Chemicals) and 0.40 g of Narlex LD 36 V (from National Starch) by intensive stirring and subsequently chain extended using 80 equivalent-% of ethylenediamine to form the polyurethane dispersion.

Stable polyurethane dispersions formulated in situ having the following characteristics were obtained:

TABLE 6

| Variant | Solids content | Brookfield viscosity |
|---|---|---|
| A | About 71% by weight | 10,000 mPa.s (20° C.) |
| B | About 71% by weight | 15,000 mPa.s (20° C.) |

Mechanical properties of polyurethane films formulated in situ based on Example 17

| Variant | A | B |
|---|---|---|
| Stress at 100% elongation $\sigma_{100}$ | 5.0 MPa | 4.3 MPa |
| Stress at 300% elongation $\sigma_{300}$ | 8.6 MPa | 6.1 MPa |
| Stress at 500% elongation $\sigma_{500}$ | 10.0 MPa | — |
| Tensile strength $\sigma_M$ | 10.6 MPa | 6.5 MPa |
| Elongation at the tensile strength ($\epsilon_M$) | 552% | 384% |

The examples described show that the materials properties of the polyurethane dispersions of the invention can be varied over a wide range depending on requirements. In the case of the pure polyurethane dispersions, the materials properties are significantly superior to those of comparable polyurethane dispersions of the prior art which have been prepared by the prepolymer mixing process. In the case of polyurethane dispersions formulated in situ, virtually any filler contents in combination with excellent materials properties can be achieved.

What is claimed is:

1. A solvent-free polyurethane dispersion, wherein the polyurethane polymer has a mean molar mass (number average) of from 25,000 to 100,000 dalton and a solids content of polyurethane polymer of from 40 to 70% by weight, based on the total amount of a pure polyurethane dispersion, said dispersion obtained by a) allowing from 10 to 50% by weight of a relatively high molecular weight polyol component (A) (i) which has at least two hydroxyl groups which are reactive toward polyisocyanates and a molar mass of from 500 to 6000 dalton plus, if desired, from 0.5 to 5% by weight of a low molecular weight polyol component (A) (ii) having at least two hydroxyl groups which are reactive toward polyisocyanates and a molar mass of from 60 to 150 dalton to react with from 5 to 25% by weight of a polyisocyanate component (B) comprising at least one polyisocyanate, polyisocyanate derivative or polyisocyanate homologue containing at least two aliphatic and/or aromatic isocyanate groups in the presence or absence of a catalyst to give a polyurethane preadduct, then b) reacting the polyurethane preadduct from step a) with from 0.5 to 5% by weight of a low molecular polyol component (A) (iii) containing at least two hydroxyl groups which are reactive toward polyisocyanates and at least one carboxyl group which is inert toward polyisocyanates and can in the presence of bases be converted completely or partially into carboxylate groups to give the corresponding prepolymer, wherein the NCO/OH equivalent ratio of components (B) and (A) is approximately 1.5:1 to 2.5:1, c) allowing the prepolymer from step b) to react with from 0.25 to 2.5% of a neutralization component (C) until the carboxyl groups have been completely or partially neutralized, subsequently or simultaneously, d) dispersing the neutralized prepolymer from step c) in from 10 to 60% by weight of water which may contain from 10 to 70% by weight of a formulation component (F) selected from among fillers, pigments, plasticizers, fibrous materials and/or other customary additives, subsequently e) reacting the dispersion from step d) with from 0.25 to 2.5% by weight of a chain extension component (D) comprising at least one polyamine having at least two amino groups which are reactive toward polyisocyanates, and f) if desired, allowing the dispersion from step e) to react with from 0.05 to 0.5% by weight of a chain stopper component (E) selected from at least one monoamine having an amino group which is reactive toward polyisocyanates.

2. A polyurethane dispersion as claimed in claim 1 wherein the polyol component (A) (i) comprises a polyether polyol and/or polyester polyol.

3. A polyurethane dispersion as claimed in claim 1 or 2, wherein the polyol component (A) (i) comprises polymeric polyols such as polyalkylene glycols, aliphatic and/or aromatic polyesters, polycaprolactones, polycarbonates, macromonomers, telechelic polymers or epoxy resins or mixtures thereof.

4. A polyurethane dispersion as claimed in claim 2, wherein the component (A) (i) comprises linear or bifunctional polypropylene glycols having a molar mass of from 3000 to 4000 dalton.

5. A polyurethane dispersion as claimed in claim 1, wherein the component (A) (i) comprises linear or bifunctional aliphatic and/or aromatic polyester polyols having a molar mass of from 1000 to 3000 dalton.

6. A polyurethane dispersion as claimed in claim 1, wherein the component (A) (iii) comprises a bishydroxyalkanecarboxylic acid.

7. A polyurethane dispersion as claimed in claim 6, wherein the bishydroxyalkanecarboxylic acid is 2-hydroxymethyl-2-methyl-3-hydroxypropionic acid.

8. A polyurethane dispersion as claimed in claim 1, wherein the component (A) (iii) has a molar mass of from 100 to 200 dalton.

9. A polyurethane dispersion as claimed in claim 1, wherein the reaction steps a) and b) are carried out at a temperature of from 60 to 120° C.

10. A polyurethane dispersion as claimed in claim 9, wherein the reaction steps a) and b) are carried out at a temperature of from 80 to 100° C.

11. A polyurethane dispersion as claimed in claim 1, wherein the NCO/OH equivalent ratio of the components (B) and (A) in steps a) and b) is set to a value in the range from 1.5 to 2.5, preferably from 1.8 to 2.2.

12. A polyurethane dispersion as claimed in claim 1, wherein the reaction step a) is carried out in the presence of from 0.01 to 1% by weight, based on the components (A) and (B), of a catalyst customary for polyaddition reactions onto polyisocyanates.

13. A polyurethane dispersion as claimed in claim 1, wherein the reaction step c) is carried out at a temperature of from 40 to 60.

14. A polyurethane dispersion as claimed in claim 1, wherein the neutralization component (C) is added in such an amount that the degree of neutralization based on the free carboxyl groups of the polyurethane prepolymer is from 70 to 100 equivalents-%.

15. A polyurethane dispersion as claimed in claim 1, wherein the neutralization component (C) comprises tertiary amines, ammonia and/or alkali metal hydroxides.

16. A polyurethane dispersion as claimed in claim 1, wherein the neutralization component (C) comprises triethylamine.

17. A polyurethane dispersion as claimed 1, wherein the reaction step d) is carried out at from 30 to 50.

18. A polyurethane dispersion as claimed in claim 1, wherein the steps c) and d) are combined by adding the neutralization component (C) to the water used for dispersing the prepolymer as in reaction step d).

19. A polyurethane dispersion as claimed in claim 1, wherein the other additives in reaction step d) are selected from among dispersants, rheological aids, antifoams, adhesion promoters, antifreezes, flame retardants, bactericides, fungicides, preservatives and further polymers and polymer dispersions.

20. A polyurethane dispersion as claimed in claim 1, wherein some or all of the formulation component (F) is stirred into the polyurethane prepolymer prior to the dispersion step corresponding to reaction step d).

21. A polyurethane dispersion as claimed in claim 1, wherein the chain extension component (D) is used in such an amount that the degree of chain extension based on the free isocyanate groups of the polyurethane prepolymer is from 50 to 100 equivalents-%.

22. A polyurethane dispersion as claimed in claim 1, wherein the chain extension component (D) comprises a bifunctional primary amine.

23. A polyurethane dispersion as claimed in claim 22, wherein the bifunctional primary amine is 1,2-diaminoethane.

24. A polyurethane dispersion as claimed in claim 1, wherein the chain stopper component (E) is used in such an amount that the degree of chain stopping based on the free isocyanate groups of the polyurethane prepolymer is from is from 1 to 20 equivalent-%.

25. A polyurethane dispersion as claimed in claim 1, wherein the chain stopper component (E) comprises a monofunctional primary amine.

26. A polyurethane dispersion as claimed in claim 25, wherein the monofunctional primary amine is 2-aminopropane.

27. A polyurethane dispersion as claimed in claim 1, wherein any free NCO groups still present after the reaction steps e) and f) are completely chain extended using water.

28. A polyurethane dispersion as claimed in claim 1, wherein the solids content of polyurethane polymer is set to from 10 to 50% by weight, and the solids content of fillers is set to from 10 to 70% by weight, based on the total amount of a polyurethane dispersion formulation in site.

29. A polyurethane dispersion as claimed in claim 1, wherein the content of carboxylate groups in the polyurethane polymer is set to from 10 to 50 meq. $(100\ g)^{-1}$.

30. A polyurethane dispersion as claimed in claim 1, wherein the mean particle size of the micelles of the polyurethane polymer in the dispersion is from 100 to 500 nm.

31. A polyurethane dispersion as claimed in claim 1, wherein the polyurethane polymer has a mean molar mass (number average) of from 25,000 to 100,000 dalton.

32. A polyurethane dispersion as claimed in claim 1, which has a viscosity of from 10 to 800 mPas.

33. A process for preparing a solvent-free polyurethane dispersion, which comprises a) allowing from 10 to 50% by weight of a relatively high molecular weight polyol component (A) (i) which has at least two hydroxyl groups which are reactive toward polyisocyanates and a molar mass of from 500 to 6000 dalton plus, if desired, from 0.5 to 5% by weight of a low molecular weight polyol component (A) (ii) having at least two hydroxyl groups which are reactive toward polyisocyanates and a molar mass of from 60 to 150 dalton to react with from 5 to 25% by weight of a polyisocyanate component (B) comprising at least one polyisocyanate, polyisocyanate derivative or polyisocyanate homologue containing at least two aliphatic and/or aromatic isocyanate groups in the presence or absence of a catalyst to give a polyurethane preadduct, then b) reacting the polyurethane preadduct from step a) with from 0.5 to 5% by weight of a low molecular weight and anionically modifiable polyol component (A) (iii) containing at least two hydroxyl groups which are reactive toward polyisocyanates and at least one carboxyl group which is inert toward polyisocyanates and can in the presence of bases be converted completely or partially into carboxylate groups to give the corresponding prepolymer, c) allowing the prepolymer from step b) to react with from 0.25 to 2.5% of a neutralization component (C) until the carboxyl groups have been completely or partially neutralized, subsequently or simultaneously d) dispersing the neutralized prepolymer from step c) in from 10 to 60% by weight of water which may contain from 10 to 70% by weight of a formulation component (F) selected from among fillers, pigments, plasticizers, fibrous materials and/or other customary additives, subsequently e) reacting the dispersion from step d) with from 0.25 to 2.5% by weight of a chain extension component (D) comprising at least one polyamine having at least two amino groups which are reactive toward polyisocyanates, and f) if desired, allowing the dispersion from step e) to react with from 0.05 to 0.5% by weight of a chain stopper component (E) selected from at least one monoamine having an amino group which is reactive toward polyisocyanates.

34. Single-component, isocyanate-free and solvent-free coatings, sealants, adhesives, paints and varnishes or membranes for the surfaces of mineral building materials said building materials selected from the group consisting of concrete, gypsum, cement, glass, wood, wood materials paper, metal, plastic, and combination thereof, comprising the polyurethane dispersion of claim 1.

\* \* \* \* \*